United States Patent [19] [11] 3,778,723
Schaefer [45] Dec. 11, 1973

[54] ZERO DEGREE PHASE COMPARATOR

[75] Inventor: Daniel F. Schaefer, Inglewood, Calif.

[73] Assignee: Rockwell International Corporation, El Segundo, Calif.

[22] Filed: Feb. 28, 1972

[21] Appl. No.: 229,867

[52] U.S. Cl. .................... 328/133, 328/155
[51] Int. Cl. .................... H03b 3/04
[58] Field of Search .................... 328/133, 134, 155

[56] References Cited

UNITED STATES PATENTS

| | | | |
|---|---|---|---|
| 3,134,076 | 5/1964 | Haner et al. | 328/134 X |
| 3,370,239 | 2/1968 | Seki et al. | 328/155 |
| 3,458,823 | 7/1969 | Nordahl | 328/155 |
| 3,548,296 | 12/1970 | Sundstrom | 328/155 X |
| 3,588,710 | 6/1971 | Masters | 328/133 |
| 3,714,463 | 1/1973 | Laune | 328/134 X |

*Primary Examiner*—John W. Huckert
*Assistant Examiner*—R. E. Hart
*Attorney*—L. Lee Humphries et al.

[57] ABSTRACT

A variable frequency three-phase square wave signal is synchronized to a three-phase reference frequency signal at a substantially zero degree phase relation. Synchronization is accomplished in but a few cycles by comparing each component of the two signals to be compared and also comparing both positive and negative going half cycles of each component. Six phase error magnitude pulses are generated for each cycle and identified according to phase error sense to provide an output error signal having a magnitude proportional to the magnitude of the phase error and having a polarity indicating phase error sense. The output signal trims the frequency of one of the signals being compared to cause the phase error to approach zero degrees.

21 Claims, 9 Drawing Figures

ZERO DEGREE PHASE COMPARATOR

BACKGROUND OF THE INVENTION

1. Field of the Invention

The present invention relates to phase comparison circuits, and more particularly concerns circuitry that will afford rapid zero degree phase comparison.

2. Description of Prior Art

Phase lock circuits are well known and have been widely used to afford precision frequency synchronization. Where a variable frequency oscillator is to be synchronized to a reference frequency source, the frequency of the variable oscillator must be caused to track the reference frequency exactly. This has been accomplished with square wave signals by driving the variable frequency wave source to a 90-degree phase relation with the reference source and employing phase lock circuitry to maintain this 90-degree phase relation. In a situation where frequency synchronization is the sole consideration, locking of the two signals at a 90-degree phase relation is entirely satisfactory.

However, in certain applications, particularly those embodying synchronous motors, for example, two signals must be locked, not only at the same frequency, but also at an exactly equal or zero degree phase relation. Such a requirement exists in the linear synchronous motor drive system described in a co-pending application of Ronald C. Starkey, for Linear Motor Propulsion System, Ser. No. 230,000, filed on Feb. 28, 1972, and assigned to the assignee of the present application. Such co-pending application of Starkey is incorporated herein by this reference, as though fully set forth.

In the system of the co-pending Starkey application, a single rotor is common to a number of mutually spaced discrete linear synchronous motor stators. The rotor is caused to be driven by and over such stators one after the other. Velocity of the rotor is directly controlled by the frequency of the stator drive signals. Where velocity is changed either for acceleration or deceleration, the stator drive signal is caused to increase or decrease in frequency. Where the rotor is to be driven at a fixed speed, a group of motor stators are driven at a first fixed (reference) frequency. The rotor is accelerated by moving it from thrust of the first group of stators to thrust of a second group of motor stators that are driven at an increasing frequency. After reaching the higher frequency, the rotor is caused to be driven by a third group of motor stators that are driven by a third higher fixed (reference) frequency. The rotor moves between groups of linear motor stators that are driven by independent frequency sources. The rotor velocity must always be locked to the stator drive frequency and further, the phase angle between the field flux that flows through the travelling rotor and the phase of the stator drive signals must always be the same (within relatively small limitations.) Thus as the rotor is transferred from one group of stators driven by a first signal source (controller) to a second group of stators driven by a second signal source (controller), arrangements must be made to insure that the two driving signal sources are synchronized to each other at the same frequency and at a zero degree phase relation.

Further, the system described in the co-pending application of Ronald C. Starkey employs drive frequencies as low as about 1 Hertz. Accordingly, frequency and phase synchronization must be achieved within the period of not more than two or three cycles of the signals being synchronized because two or three cycles at such low frequencies require two or three seconds.

Phase lock circuits that will meet requirements of a linear synchronous motor system of the type described above have not heretofore been available. Accordingly it is an object of the present invention to provide a system and method for achieving rapid high resolution zero degree phase comparison and/or synchronization.

SUMMARY OF THE INVENTION

In carrying out principles of the present invention in accordance with a preferred embodiment thereof, error magnitude detector means are provided for generating magnitude signals representative of the amount of phase difference between first and second signals to be compared, error sense detector means are provided to generate signals indicating the sense of the phase difference and combining means responsive to both of the detector means are employed to generate an output signal representing both magnitude and sense of the phase difference. A significant aspect of the invention is the application of a phase error signal in a feedback arrangement that trims a variable frequency signal in a direction to cause the phase error to approach zero. Another aspect of the invention embodies derivation of phase error information from each half cycle of the signals being compared and, when the signals are multiphase, from each half cycle of each component of the signals being compared. Still another aspect of the invention embodies derivation of phase error magnitude and sense information by generating a reference signal that uniquely follows that one of the compared signals having a preselected phase sense relative to the other and combining such reference signal with both of the compared signals.

DETAILED DESCRIPTION

Figure 1:
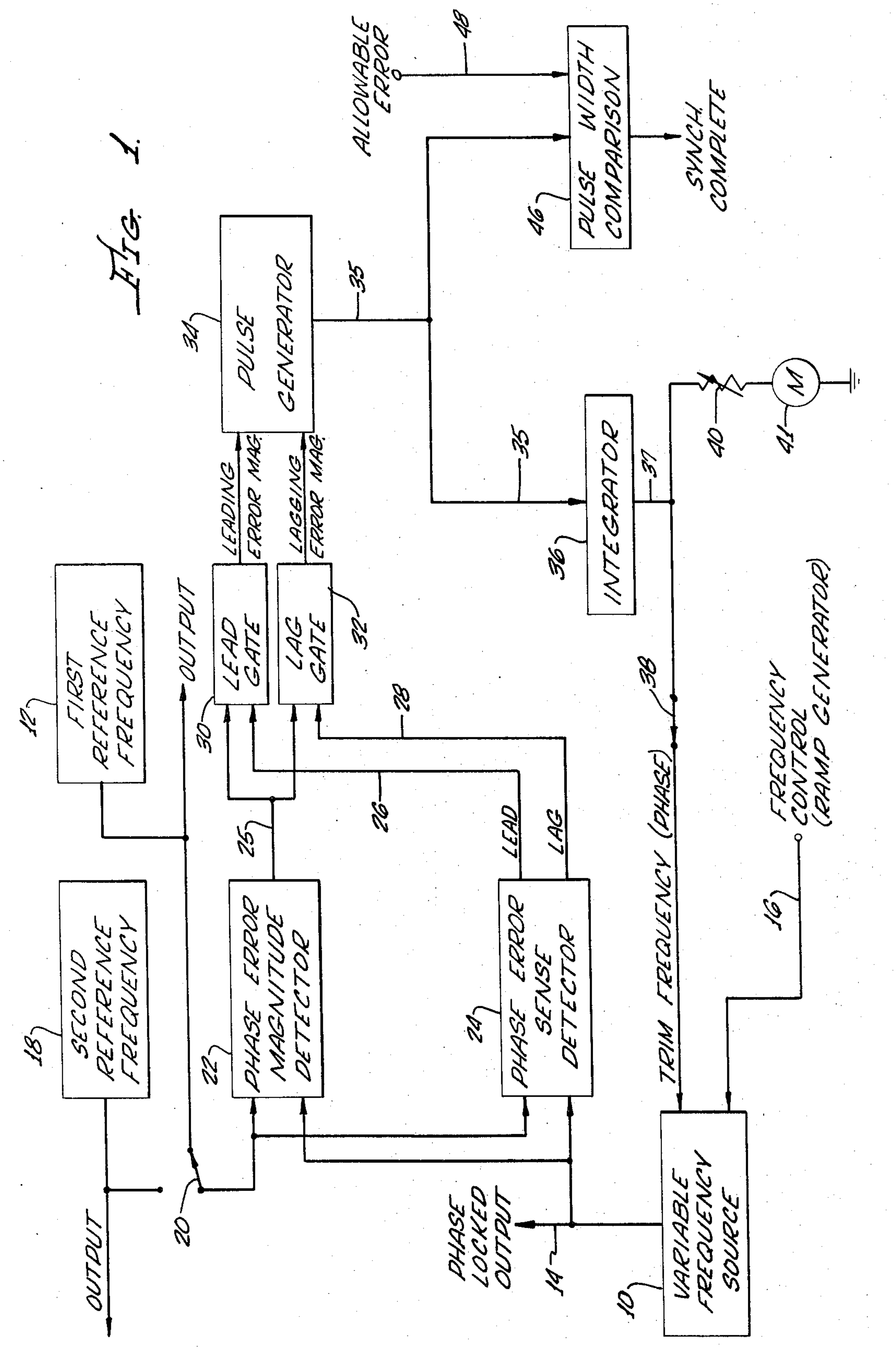
FIG. 1 is a block diagram illustrating an overall arrangement of a system and method of the present invention.

Illustrated in FIG. 1 is a phase and frequency synchronizing arrangement that is applicable either to single phase signals or multiphase signals. A variable frequency source 10 is to be phase locked in a zero degree phase relation to a first reference frequency source 12. Where the synchronizing circuitry is employed in a linear synchronous motor propulsion system of the type described in the above identified co-pending application of Ronald Starkey the variable frequency source 10 is an acceleration or deceleration controller. Such a controller is actually a DC to AC inverter which provides a square wave signal on an output 14 that has a frequency primarily controlled by an analog input speed command signal on an input line 16. The frequency command signal on line 16, as more particularly described in the co-pending application of Starkey, may command several different fixed frequencies or a frequency ramp, that is, a frequency that varies from one fixed frequency to another.

The first reference frequency source 12, illustrated in FIG. 1, may comprise a controller that is an inverter driver (identical to inverter 10) for a synchronous motor stator of fixed velocity and therefore, of fixed drive frequency. A second reference frequency source 18, illustrated in FIG. 1, may comprise a third controller, also an inverter, that drives the stators of a group of linear synchronous motors that will thrust the rotor at a second fixed velocity. The several inverters or controllers are all substantially identical, differing only in their analog frequency control inputs, and in their output frequencies. In application of these inverters, the rotor is initially driven at a fixed velocity over motors controlled from the output of the first reference frequency source (inverter 12). The variable frequency source (inverter 10) is then phase and frequency locked to the first reference frequency (of inverter 12) by the circuitry to be described herein and the rotor propelled by motors under control of the phase locked output of the variable frequency source 10. The output on line 14 is allowed to increase in frequency (for acceleration of the rotor) until it is equal in frequency to the output of the second reference frequency source (inverter 18) at which time a switch 20 is moved from the position illustrated in FIG. 1 to allow the second reference frequency to be compared with the variable frequency. Thus the variable frequency source may now be synchronized in zero degree phase relation to the second reference frequency to allow the rotor to be shifted from motors driven by the variable frequency source to motors driven by the second reference frequency.

As illustrated in FIG. 1 the phase synchronization is achieved by feeding the output signal from the sources 10 and 12 or alternatively from the sources 10 and 18, concomitantly to a phase error magnitude detector 22 and to a phase error sense detector 24. The error magnitude detector compares the two input signals and provides an error magnitude signal on line 25 that represents the magnitude of the error. As will be more particularly described below, this circuit produces a number of output pulses, each of which has a parameter that is proportional to the phase difference in degrees between the two input signals. Most conveniently, this parameter is pulse width, although it will be readily appreciated that other circuitry having other information bearing parameters may be employed.

A phase error sense detector 24 operates upon the two input signals and provides a sense output signal that indicates whether a given one of the two input signals leads or lags the other. In the illustrated embodiment, if the variable frequency signal leads the reference, an output signal appears on line 26. If the variable signal lags the reference, no signal appears on line 26, but a signal appears on line 28. Signals on lines 26 and 28 are employed to respectively enable a lead gate 30 and a lag gate 32. The phase error magnitude pulses on line 25 are fed to the gates 30 and 32 and are accordingly passed through one or the other of these gates depending upon whether the variable frequency leads or lags.

Thus the output of gates 30 and 32 is a series of pulses from one or the other, each having a pulse width proportional to the number of degrees of phase error. If a phase error is present, its magnitude will be represented at the output of one or the other of gates 30 and 32. Thus leading phase error magnitude pulses are separated from lagging phase error magnitude pulses. Both leading and lagging pulses are fed to a pulse generator 34. The latter fixed one of the two pulse parameters of width and height so that there will be only one variable to represent the phase error magnitude. In the described embodiment pulse width is used to represent phase error wherefore the pulse generator standardizes amplitude of all pulses fed thereto. Pulses on one of the input lines, either the leading or the lagging error magnitude pulses, are inverted by the pulse generator so that the pulses provided on its output line 35 are of one polarity or the other, depending upon whether the phase error is of one sense or the other. If the direction of the error is a lead of the variable signal as compared with the reference signal, the output of the pulse generator is positive and has a pulse magnitude that is fixed at a preselected standard positive pulse voltage. If the error is a lagging error, the pulse generator output is negative, fixed to an equal standard but negative pulse height voltage. Thus the pulse heights or amplitudes are standardized, wherefore the average DC voltage of the pulse train on output lead 35 of the pulse generator is proportional only to the pulse width of the individual pulses.

The pulses from the pulse generator whether positive or negative, are fed to an active filter or integrator 36, which converts and filters the train of pulses to a relatively smooth DC voltage that is positive or negative depending upon whether the error is lagging or leading. The amplitude of this output DC voltage on output lead 37 of the integrator is always proportional to the pulse width and therefore directly proportional to the magnitude of the phase error in degrees. Thus there is provided on output line 37 a trim frequency or or trim phase signal in the form of an analog voltage that is positive for a lagging error and negative for a leading error, and always has a magnitude directly proportional to the number of degrees of phase error. This trim frequency or trim phase signal is fed as a second frequency controlling input to the variable frequency source 10 to control the frequency of the output signal therefrom in a sense such as to cause the phase error to approach zero. This completes the closed loop phase tracking of the variable frequency source to the chosen reference frequency and phase.

Where the variable frequency source is caused to vary in frequency under command of a frequency changing control input on line 16, the trim phase signal is not needed and a switch 38 in the feedback path between the integrator 36 and the variable frequency source 10 may be moved to open position to disable the feedback path. It should be noted that during such a condition, when the frequency of the variable frequency source is changing rapidly, the phase error will be changing rapidly and repetitively through large amounts in an attempt to follow the beat frequency. In such situation the operation of the filter or integrator 36 will act to limit the magnitude of the feedback error signal on line 37.

The trim phase control signal, as previously mentioned, drives the variable frequency source so as to match its phase exactly with the phase of the reference. Phase shift between the two wave forms, that of the variable frequency source and that of the reference, will be essentially zero, having a small error that depends upon tracking accuracy of the variable frequency source itself and the gain of the error detector circuits. Practical gains which can be adjusted by adjusting the gain of the integrator can be made large enough to produce phase errors of as little as a fraction of a degree.

If deemed necessary or desirable, visual monitoring of the magnitude and sense of the phase error may be readily achieved by feeding the error signal on line 37 through a variable calibrating resistor 40 to a meter 41 which will display both the magnitude and sense of the actual error. Obviously where indication and readout only is required, and no closed loop phase tracking is desired, the meter 41 may be employed and the feedback path 37 not employed, or disabled as by opening switch 38.

Although the described phase tracking and synchronization is accomplished quite rapidly within the time period of about two to three cycles of the frequencies being compared, it still may be desirable to signal when such synchronization has been achieved. A signal indicating completion of the phase synchronization is employed as more particularly described in the above-identified co-pending application of Ronald C. Starkey. To achieve such "synchronization complete" signaling, the output pulses from pulse generator 34 are fed to a pulse width comparison circuit 46 where they are compared with an allowable error magnitude that is fed to the comparison circuit 46 via an input line 48. The width of the pulses from generator 34 represent the magnitude of the measured phase error. Accordingly the allowable error employed for comparison in the circuit 46 is conveniently a time interval having a duration that represents the magnitude of phase error that is considered for any particular system to comprise a completion of the phase synchronization. Such an allowable error may be one or two degrees or less.

Where phase synchronization is achieved at frequencies that are always equal or substantially equal, and where phase error is represented as a time interval by pulse width, the allowable error input to the comparison circuit 46 may be in a form such as to establish a fixed reference interval. However, at differing frequencies, a fixed reference interval would represent differing phase magnitudes. Accordingly, if the comparison circuit 46 is to be employed where phase synchronization at different frequencies is achieved (at different times) the allowable error interval is preferably not a fixed interval but is based upon frequency. In such an arrangement it would be convenient to produce an allowable error interval that varies according to the particular frequency chosen as a reference. Thus a relatively fixed allowable phase synchronization error may be achieved even though synchronization is alternatively effected at different frequencies.

The arrangement illustrated in FIG. 1 generally represents an application of the present invention to comparison of either one phase or multiphase signals. In the above-identified co-pending application of Ronald Starkey the inverter drive signals comprise three-phase square waves, such as those shown in FIG. 2. Thus, for example, the variable frequency source may provide on output line 14 (of FIG. 1) a square wave signal having three components illustrated as $A_1$, $B_1$ and $C_1$ of FIG. 2, each of the components being phase displaced from the others by 120°. The reference frequency to which the variable frequency source is to be phase locked similarly comprises a three phase square wave having three mutually displaced components $A_3$, $B_3$ and $C_3$ phase displaced by 120° and all having the same frequency as the components of the variable signal, at least when the phase synchronization is to be achieved. Although such signals and each of their components are generally symmetrical, having equal duration positive and negative going part cycles, such symmetry is not required for the practice of the present invention where the two waves being compared have identical non-symmetry. If such identical non-symmetry is not available, leading (or trailing) edges may be used to toggle flip flops and produce symmetrical half frequence square waves.

Figure 2:
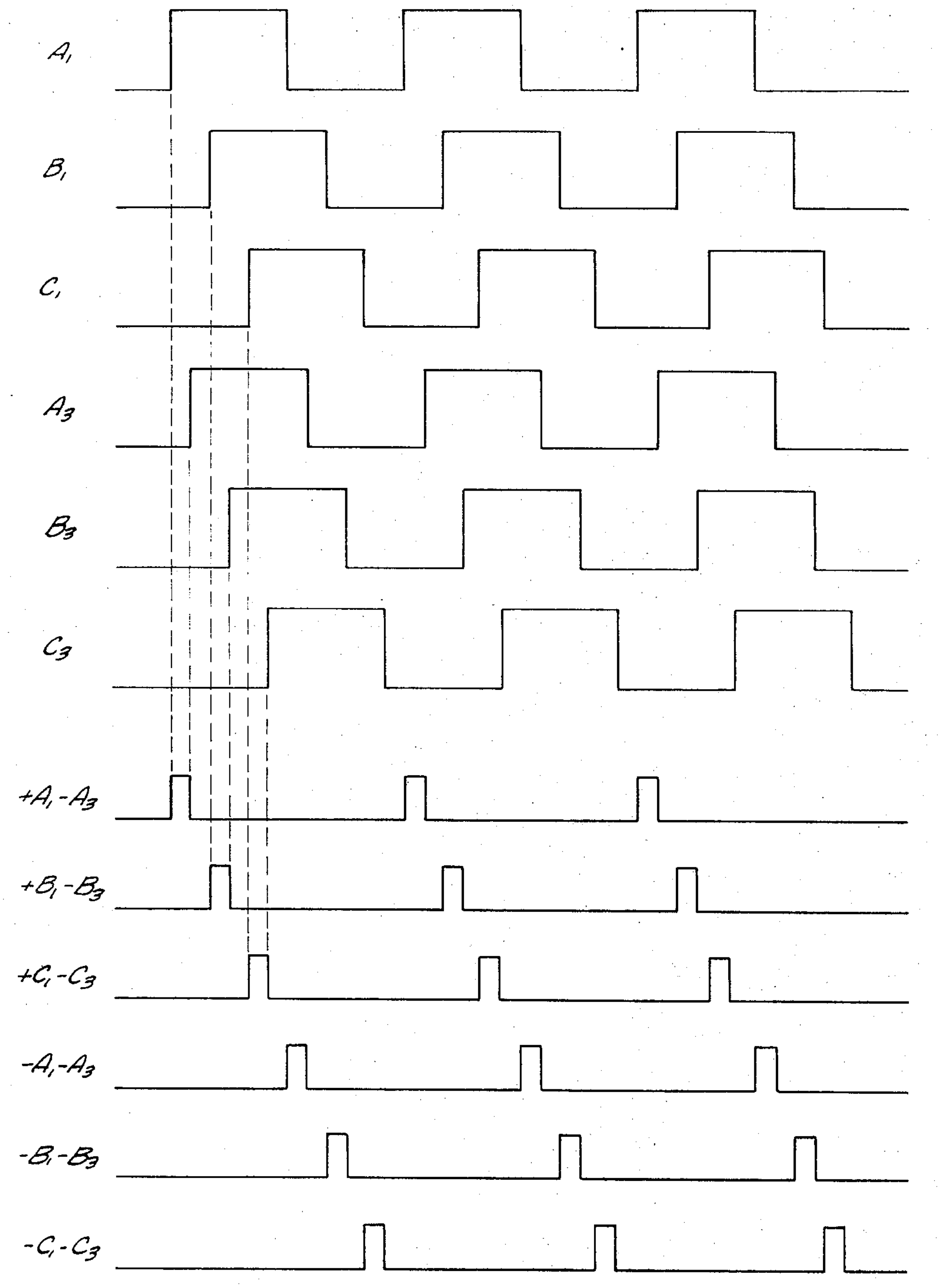
FIG. 2 illustrates exemplary 3-phase wave forms that may be synchronized in accordance with the present invention.
Figure 3:
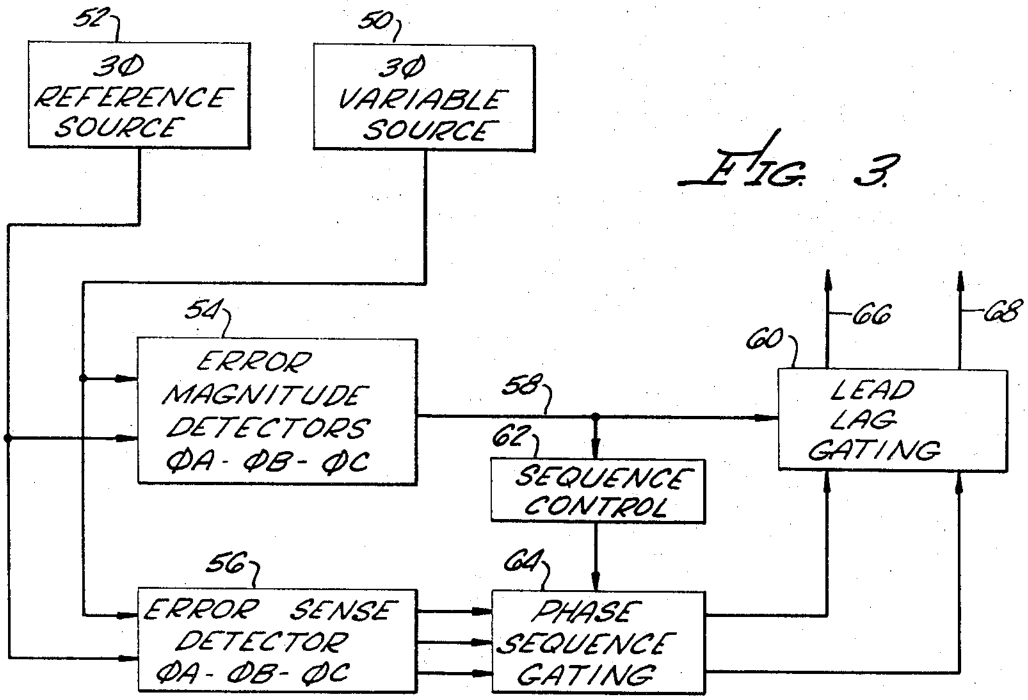
FIG. 3 is a block diagram of certain portions of an embodiment of the invention that enable synchronization of three-phase signals of the type illustrated in FIG. 2, FIGS. 4 and 5 comprise a detailed logical diagram of the embodiment shown in FIG. 3.

Illustrated in FIG. 3 are components of an embodiment of the invention specifically arranged for synchronization of the two three-phase signals of FIG. 2. Thus signals $A_1$, $B_1$, and $C_1$ are provided by a 3-phase variable frequency source 50 and the signals $A_3$, $B_3$ and $C_3$ are provided by a three-phase reference source 52. These signals are fed to a three-phase error magnitude detector 54 and also to a three-phase error sense detector 56, both of which are analogous to the components designated as 22 and 24 respectively of FIG. 1. The error magnitude detector circuitry 54 provides error magnitude pulses on an output line 58 that are fed to sense or lead-lag gating circuits 60. These error magnitude pulses on line 58 are also fed to a sequence control circuit 62 which operates a phase sequence gating circuit 64 to sequentially pass error sense signals of the respective phases from detector 56 in synchronism with the magnitude signals of detector 54 that appear on line 58. The sequential sense signals passed through sequence gating 64 are employed to control the lead-lag gating circuit 60 which provides error magnitude output pulses on a line 66 when the variable source lags, and provides error magnitude pulses on a line 68 when the variable source leads the reference source. The signals on lines 66 and 68 are fed to the pulse generator and integrator circuit shown in FIG. 7 and more particularly described hereinafter.

Figure 4:
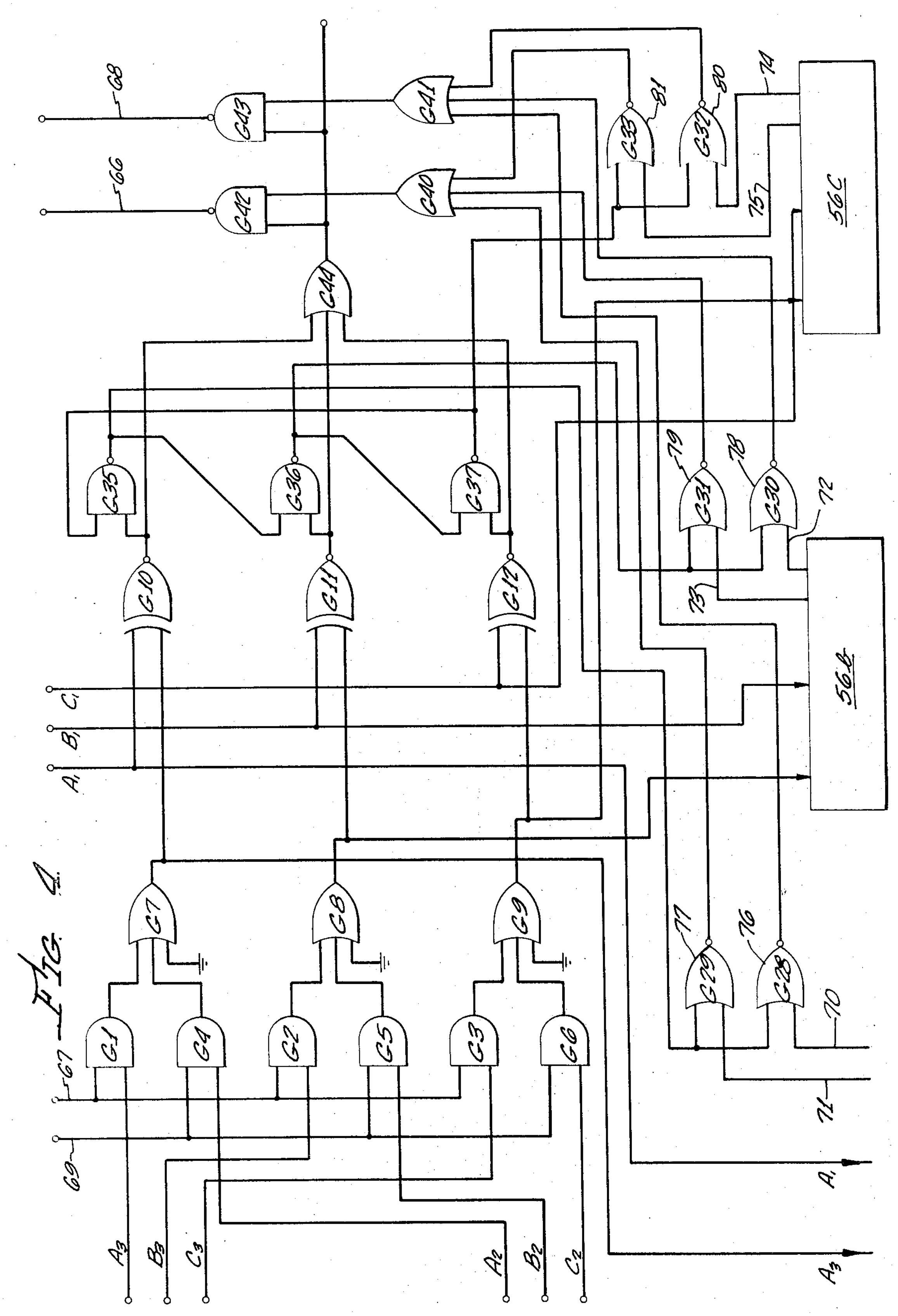
Figure 5:
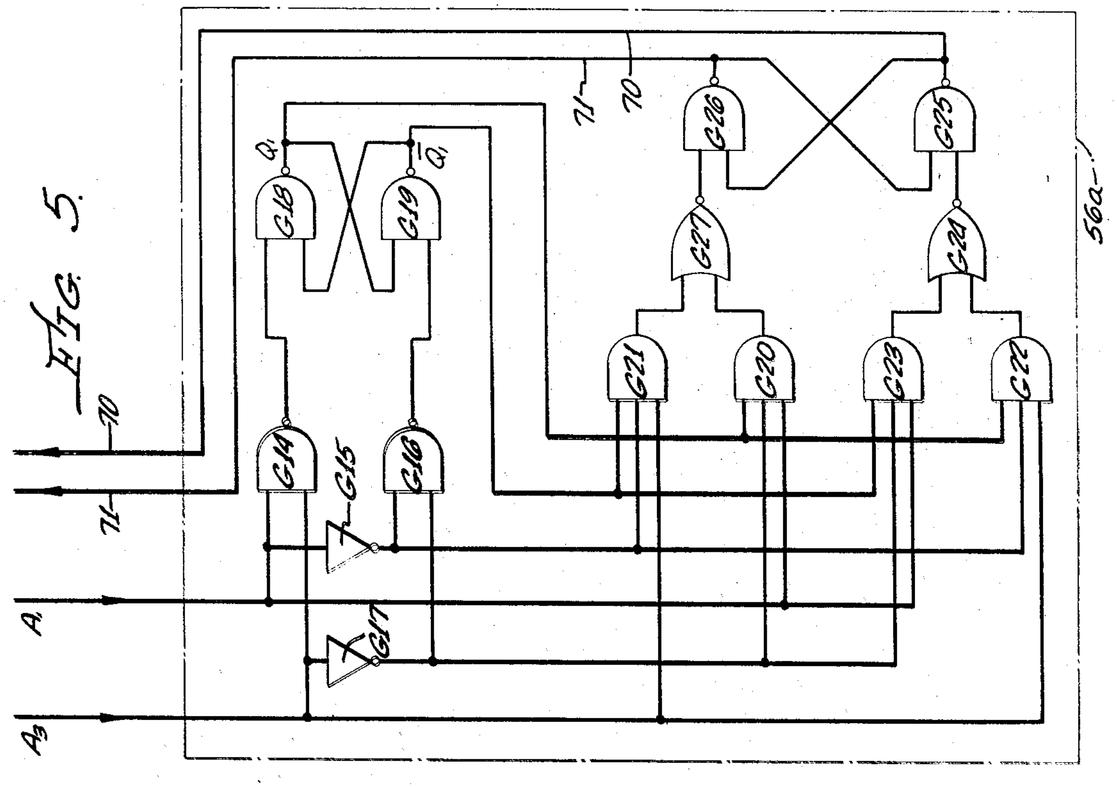

Illustrated in FIGS. 4 and 5 are details of logic that implements the arrangement of FIG. 3. The components $A_3$, $B_3$ and $C_3$ of the three-phase reference source are fed as first inputs to a group of AND gates G1, G2 and G3 that are respectively enabled by a logical one signal on a control lead 67 when the signal components $A_3$, $B_3$ and $C_3$ are to be applied as the reference. A second and alternative reference source provides three-phase signal components $A_2$, $B_2$ and $C_2$ that are fed as first inputs to AND gates G4, G5 and G6 which are respectively enabled by a logical one input on a control lead 69.

When lead 69 is one, lead 67 is zero and vice versa so that one or the other of the three-phase reference signals is selected and fed via three OR gates G7, G8 and G9 as a first or reference input to respective ones of a group of three exclusive OR gates G10, G11 and G12. The second input to each of the exclusive OR gates comprises the components $A_1$, $B_1$ and $C_1$ respectively of the variable source 50 of FIGS. 2 and 3. The exclusive OR gates conventionally provide a logical function that produces an output if and only if the two input signals do not exist in coincidence. Alternatively stated, the output of an exclusive OR gate is logical one when either one of its inputs is logical one, but is logical zero when both of its inputs are logical one or both are logical zero. Accordingly zero output is produced when the two inputs to the exclusive OR gate are exactly time coincident, wherefore zero output is produced when the signals have zero phase error. The output of each of the exclusive OR gates G10, G11 and G12 is a pulse having a width proportional to the number of degrees of noncoincidence of the two inputs thereto, or directly proportional to the phase error. Accordingly the exclusive OR gates G10, G11 and G12 comprise the error magnitude detector of this embodiment of the present invention.

Corresponding components of the two three-phase signals being compared are fed to three separate error sense detectors 56A, 56B and 56C. Since these circuits are each identical to the other, details of only one are illustrated. The phase A error sense detector 56A receives the first component $A_1$ of the variable signal and the first component $A_3$ of the reference signal. Similarly the phase B sense detector 56B receives the second component $B_1$ and the second component $B_3$ of the variable and reference signals and the third sense detector 56C receives the third component $C_1$ and the third component $C_3$ of the variable and reference signals. In the phase A detector 56A, signal $A_1$ is fed as the first input to a NAND gate G14, inverted in an inverter G15 and thence fed as the signal $\overline{A}_1$ as one input to a NAND gate G16. The first component $A_3$ of the reference signal is fed as the second input to gate G14, inverted in a gate G17 and thence fed as the second input $\overline{A}_3$ to gate G16. The outputs of the NAND gates are logical zero when and only when both inputs thereto are logical one. These outputs are fed respectively at first inputs to NAND gates G18 and G19 which have the second inputs thereof cross-connected to their outputs to thereby provide a bi-stable circuit or flip flop of which the two outputs $Q_1$ and $\overline{Q}_1$ respectively always have mutually exclusive states.

Figure 6:
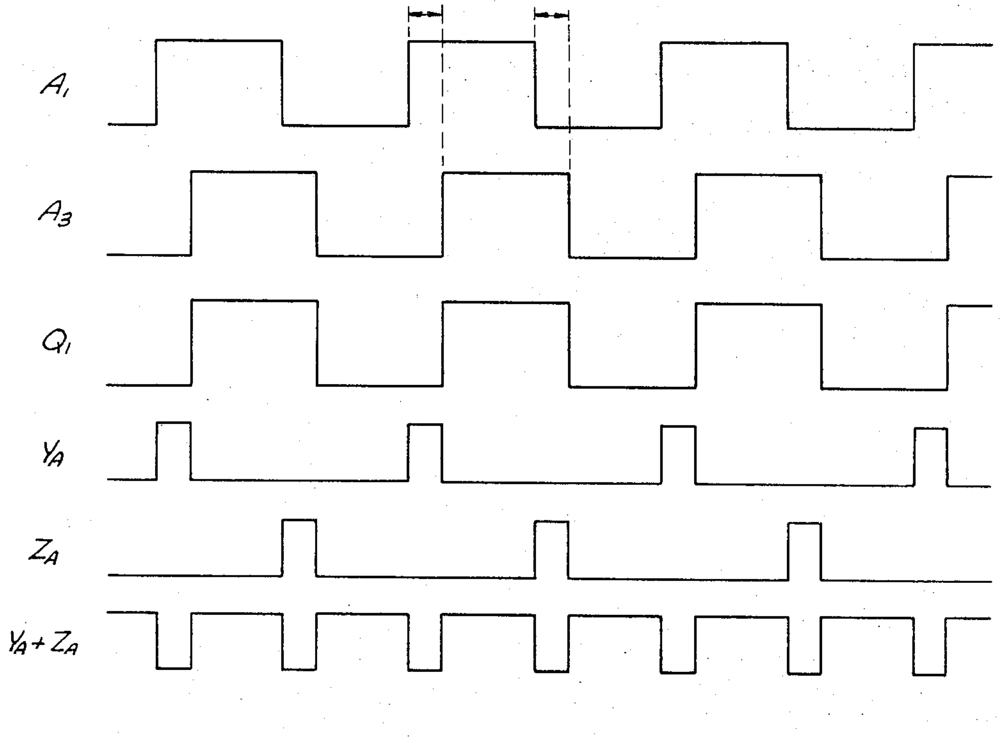
FIG. 6 depicts certain wave forms and timing relations that illustrate the operation of parts of the logic of FIGS. 4 and 5.

The arrangement of gates G14, G16, G18, and G19, is such that the output of G18, signal $Q_1$ will always exactly coincide with that one of the two input signals $A_1$ and $A_3$ that that lags the other. This relation is illustrated in FIG. 6 which shows a situation wherein the component $A_1$ of the variable frequency signal leads the corresponding component $A_3$ of the reference signal by approximately 45°. The flip flop gating arrangement of G14, G16, G18 and G19 is such that the signal $Q_1$ will follow the lagging signal $A_3$ shown in FIG. 6. The signals $Q_1$ and $\overline{Q}_1$ from gates G18 and G19 may be termed "selector" signals since they always represent or select that one of the input signals that has a predetermined phase sense relative to the other. In the illustrated embodiment such predetermined phase sense is a lagging relation. Parenthetically it is noted that the phase errors illustrated in FIGS. 2 and 6 are illustrative only. The described system will handle any phase error between zero and plus or minus 180° for a single phase system and provide a linear output. Any error from zero to plus or minus 180° will be handled by a three-phase system, but the output would be linear only between plus or minus 60°.

When $A_1$ and $A_3$ are both one, the output of G14 is zero and the output of G16 is one. With an input from G14 of zero, the output of G18, namely $Q_1$, is one. After coincidence of $A_1$ and $A_3$, $A_1$ will go to zero first if it is leading, whereupon the first input to G18 goes to one. However, the second input to G18 from the output of G19 is still zero since $A_3$ is still one and the output of G16 gives a one input to G19. Therefore, $\overline{Q}_1$ is zero and $Q_1$ will remain one when $A_1$ goes to zero as long as $A_3$ remains one. Now when $A_3$ also goes to zero, $Q_1$ will follow. When both $A_1$ and $A_3$ are zero, which first occurs when $A_3$ goes to zero, the output of G16 is zero and $\overline{Q}_1$ becomes one. When $\overline{Q}_1$ becomes one, and both $A_1$ and $A_3$ are zero, or either $A_1$ and $A_3$ is zero, $Q_1$ becomes zero. Accordingly it will be seen that pulses $Q_1$ and $\overline{Q}_1$ represent the positive going and negative going half cycles respectively of the lagging one of the two components being compared. In the situation illustrated in FIG. 3, $Q_1$ and $\overline{Q}_1$ respectively follow the positive and negative half cycles of component $A_3$. If $A_1$ were lagging $A_3$, $Q_1$ would follow $A_1$, not $A_3$.

The signals $Q_1$ and $\overline{Q}_1$ are combined in AND gates 22 and 23 respectively with the signals $\overline{A}_1$ and $A_3$ and with the signals $A_1$ and $\overline{A}_3$. Similarly the signals $Q_1$ and $\overline{Q}_1$ are combined in respective gates G20 and G21 with the signals $A_1$ and $\overline{A}_3$ and in gate G21 with signals $A_3$ and $\overline{A}_1$. For the illustrated situation of FIG. 6 where an $A_1$ leads, gate G22 provides the signal $Z_a$ of FIG. 6 indicating coincidence of $Q_1$, $A_3$ and $\overline{A}_1$.

The signal $Z_a$ is a phase sense indication provided in effect by comparing the leading edges of negative going half cycles of the components $A_1$ and $A_3$. Similarly the signal $Y_a$ provided by gate G23 is logical one when $A_1$ is one and concomitantly both $A_3$ and $Q_1$ are logical zero. This signal $Y_a$ accordingly represents a phase sense comparison of the leading edges of positive going half cycles of $A_1$ and $A_3$.

The two signals $Y_a$ and $Z_a$ from gates G23 and G22 respectively are fed to a NOR gate G24 which provides an output signal for the leading condition illustrated in FIG. 6. The NOR gate, as is conventional has an output that is logical one if and only if both of its inputs are logical zero.

The output of NOR gate G24 is fed as one input to one of a pair of NAND gates G25 and G26 having their inputs and outputs cross-connected as indicated to provide a flip flop or bi-stable device. The second input to gate G26 of this flip flop is provided from lag indicating logic comprising a NOR gate G27, having inputs from the NAND gates G20 and G21. Gates G20 and G21 operate for a lagging condition of $A_1$ with respect to $A_3$ just as gates G22 and G23 operate for a leading condition. Accordingly the output of gate G24 will provide the signal $Y_a + Z_a$ as shown in FIG. 6, that is logical zero whenever $A_1$ leads $A_3$ and when the $A_1$ is not coincident with $A_3$. In effect, the combined signal $Y_a + Z_a$ is a train of negative going pulses that is an inversion including the pulses of trains $Y_a$ and $Z_a$ and indicates the leading condition of $A_1$ relative to $A_3$.

Similarly the output of NOR gate G27 will provide a signal that is analogous to $Y_a+Z_a$ but is logical zero whenever $A_1$ lags $A_3$ and $A_1$ is not coincident with $A_3$. The arrangement of inputs to gates G25 and G26 provides a steady logical one output from G25 on line 70 and zero from G26 on line 71 when $A_1$ leads. When $A_1$ lags, the signal on line 70 is zero and that on line 71 is one. Should the phase error go to zero magnitude the bi-state device G25, G26 will remain in the state that represents the sense last detected, but its output has no meaning or effect in the case of zero magnitude error.

Thus it will be seen that the output of the phase A error sense detector 56A comprises a logical one signal on its output line 70 when $A_1$ leads $A_3$ and a logical one signal on its output line 71 when $A_1$ lags $A_3$. Similarly logical one output signals on lines 72 and 74 of error sense detectors 56B and 56C indicate that $B_1$ and $C_1$ components respectively lead corresponding components $B_3$ and $C_3$, whereas logical one output signals on lines 73 and 75 of error sense detectors 56B and 56C indicate that a lagging condition occurs.

The lead-lag sense signals on lines 70, 71, 72, 73, 74 and 75 are fed to the phase sequence gating comprising NOR gates G28, G29, G30, G31, G32 and G33 respectively.

The phase sequence gates G28–G32, which are equivolent to the gating identified at 64 in FIG. 3, are enabled under control of a three-phase sequence control comprising NAND gates G35, G36, and G37, each having a first input from a respective one of the exclusive OR gates G10, G11 and G12, and a second input from the output of the preceding NAND gate of this string of sequence control gates. The interconnection of these NAND gates operates to provide a logical zero output sequentially from each of the gates G35, G36 and G37. The outputs of the exclusive OR gates are sequentially logical one, as illustrated by the last six lines of FIG. 2. These lines represent comparison of positive and negative half cycles of the three components as indicated. Thus for example, the line $+A_1$ $A_3$ and line $-A_1$ $A_3$ collectively represent the output of gate G10 for the $A_1$ leading condition shown in the upper portion of FIG. 2. When the output of exclusive OR gate G10 is one, the output of gates G11 and G12 are each zero and the same is true for the latter gates, each of which provides a one output that is unique at any given instant. Of course, should the phase error between the two signals being compared actually be zero, the exclusive OR gates provide zero outputs. In such a case, the sequence control is not needed because no signal is passed by the lead-lag gating 60 of FIG. 3.

Consider the situation where the output of gate G10 is one and the output of G37 is one. This provides a zero output from G35, whereas each of gates G36 and G37 provides a logical one output, having zero inputs from gates G11 and G12. Now as the output of gate G10 goes to zero and the output of G11 goes to one, G36 uniquely provides the zero output whereas G35 and G37 each provides a one output. Similarly as the output of gate G11 goes to zero and the output of gate G12 goes to one NAND gate G37 uniquely provides the zero output. Thus the arrangement acts much like a ring counter that is triggered by the sequential outputs of the exclusive OR gates G10, G11 and G12.

Gate G35 of the sequence gating enables both G28 and G29 of the error sense detector 56A. The output of gate G36 is connected to enable both of the sequence gates G30 and G31 of the error sense detector 56B, and the output of G37 is connected to enable both of the sequence gates G32 and G33 of the error sense detector 56C. Accordingly, an output is provided from the phase sequence gating of the three error sense detectors 56A, 56B, 56C, in sequence.

All of the signals on the lag lines from the three error sense detectors are fed to a three input OR gate G40, and all of the signals on the lead lines of all components of the error sense detectors are fed to a three input OR gate G41. The outputs of each of these OR gates are fed respectively to a NAND gate G42 and a NAND gate G43 which comprise the lead-lag gating 60 of FIG. 3.

The error magnitude signals from the outputs of all of the exclusive OR gates G10, G11 and G12, are fed through a three input OR gate G44 and thence to both of the lead-lag gates G42 and G43. Accordingly one or the other of these gates will pass the error magnitude signals depending upon whether the variable signal lags or leads.

If the variable signal lags the reference signal, an output appears on line 66 from G42 in the form of a series of pulses each having a width proportional to the magnitude of phase error between the variable and reference frequencies. If the variable frequency leads the reference frequency, there appears on line 68 at the output of gate G43 a series of pulses each having a width proportional to the magnitude of the leading phase angle. As can be seen from inspection of FIG. 2, the pulses that appear on either lines 66 or 68 comprise a train of pulses of which there is one pulse for each half cycle of each phase of the signal being compared. In other words, for a signal of N phases there are 2N pulses on either line 66 or 68 for each full cycle of the signal. Thus six pulses are obtained for each cycle of a 3-phase signal, and each pulse individually has a width proportional to the phase difference between the variable and reference frequencies. In FIG. 2, the waveforms labeled $+A_1$ $A_3$, $+B_1$ $B_3$ and $+C_1$ $C_3$ illustrate the three pulses per cycle obtained for the positive going half cycle and the waveforms labeled $-A_1$ $A_3$, $-B_1$ $B_3$ and $-C_1$ $C_3$ illustrate the three pulses per cycle for the negative going half cycle. These pulses may be combined and averaged, to obtain a high resolution measurement in a relatively short time. The ability to obtain a number of discrete measurements (each individual pulse from one of the exclusive OR circuits is a discrete magnitude measurement) enables a useful phase error measurement to be made within the time interval of a very small number of cycles of the signals being compared. Thus, for example, where the signals being compared have frequencies as low as one Hertz, a useful measurement may be obtained within two to three seconds, or two to three cycles.

Figure 7:
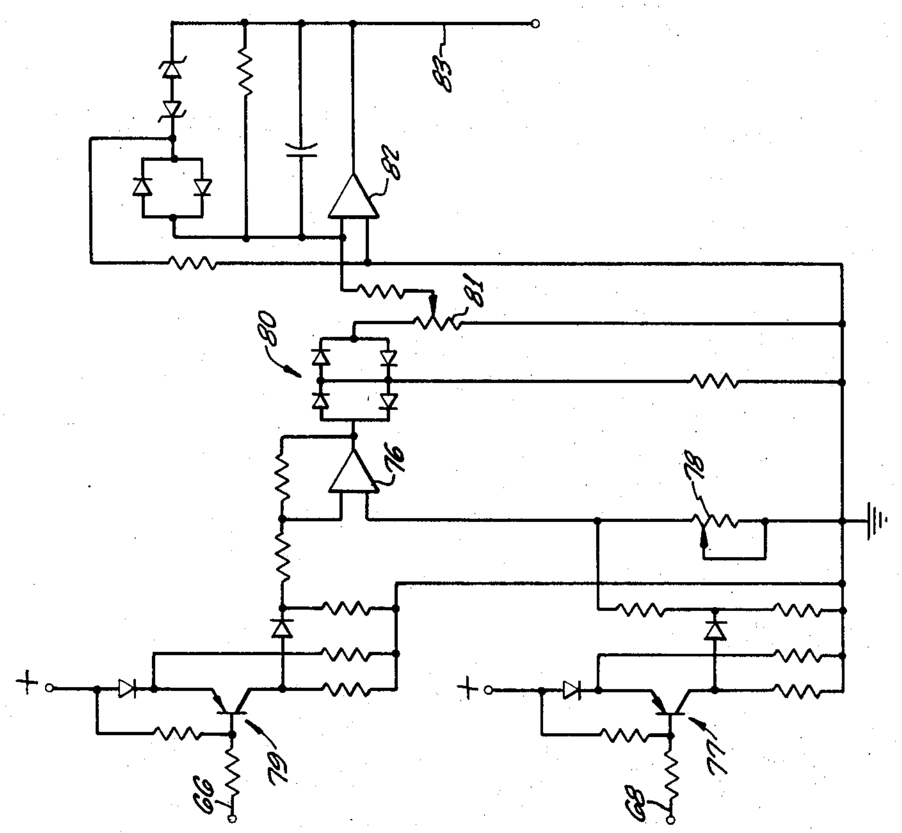
FIG. 7 shows the circuitry of a pulse generator and integrator that are applicable for use in the invention.

Referring now to FIG. 7 which illustrates circuitry of the pulse generator and integrator 34, 36 of FIG. 1, the lag pulses on line 66 of FIG. 4 are fed via a first amplifier 79 to the negative input of a differential amplifier 76. The lead pulses on line 68 of FIG. 5 are fed via an amplifier 77 to the positive input of the differential amplifier 76. The transistor circuits 79 and 77 are arranged to provide standardized (fixed level) output voltages at their respective collectors in response to input pulses thereto. Accordingly the magnitudes of the input pulses fed to differential amplifier 76 are equal at all times. Only the width of such pulses varies. The differential amplifier 76 is balanced by means of a potentiometer 78 so that its output varies from zero in a negative direction for lagging input pulses provided via line 66 and varies from zero by an equal amount in positive direction in response to leading input pulses on line 68.

The positive or negative going equal magnitude but variable width pulses from differential amplifier 76 are passed via a bi-directional diode circuit 80 and via a gain adjusting resistor 81 to an active filter that takes the form of an integrating amplifier 82. The latter provides an output on line 83 in the form of an analog signal having a magnitude that is directly proportional to the phase error in degrees and having one polarity when the phase error is of one sense and having an opposite polarity when phase error is of the other sense. In the particular arrangement illustrated the integrator output is negative when the variable frequency leads and positive when it lags. Obviously an opposite polarity convention may be chosen. Further the output signal may be so arranged as to vary above and below some reference other than zero volts to indicate lag or lead, or to indicate lead or lag respectively.

It will be understood that where the sense of the phase error is relatively unchanged, as in a system where measurement only is taking place, as distinguished from a closed loop phase tracking system that may involve considerable hunting about the zero degree phase relation, it is not necessary to employ phase error sense pulses obtained from each phase and from each half cycle of each phase. In such a situation, but one of the pulses $Y_a$ or $Z_a$ (for the leading condition illustrated) need be obtained for one cycle of but one of the components of a multiphase signal and such one pulse per cycle may be employed to gate all of the error magnitude pulses. However, the illustrated arrangement is preferred to enhance the rapidity of the sense measurement as may be required for specific applications.

It will be readily understood that where the illustrated system is employed for phase measurement upon single phase signals, there need be only one magnitude detector and one sense detector and no sequential gating need be employed.

From analysis of the lead-lag circuit 56A shown in detail in FIG. 5 and review of the waveforms shown in FIG. 6, it becomes apparent that the signal pulses $Y_a$ and $Z_a$ produced at the output of NOR gate G24 exist only when the variable signal $A_1$ is not coincident with the reference signal $A_3$. Accordingly the duration or width of each of pulses $Y_a$ and $Z_a$ is directly proportional to the magnitude of the phase difference in degrees between signals $A_1$ and $A_3$. As previously described, these signals $Y_a$ and $Z_a$ are produced from gate G24 only for the leading condition illustrated in FIG. 6, wherein variable signal $A_1$ leads the reference $A_3$. For the other condition, where the variable signal $A_1$ lags the reference, no signals are produced at the output of gate G24. This is so because neither of the quantities $\overline{Q}_1 \cdot A_1$ (an input of G23) or $Q_1 \cdot \overline{A}_1$ (an input of G24) can be true for the condition of $A_1$ lagging. However, for such lagging condition NOR gate G27 produces pulses, one for each half cycle that exist only during non-coincidence of the variable signal $A_1$ and the reference $A_3$. Further, such signals at the output of gate G27 occur only for a lagging phase relation. Accordingly it will be seen that signals at the output of the two NOR gates G24 and G27 are separated according to whether a leading or lagging condition exists and each includes phase difference magnitude information since each pulse has a width proportional to the phase difference.

Figure 8:
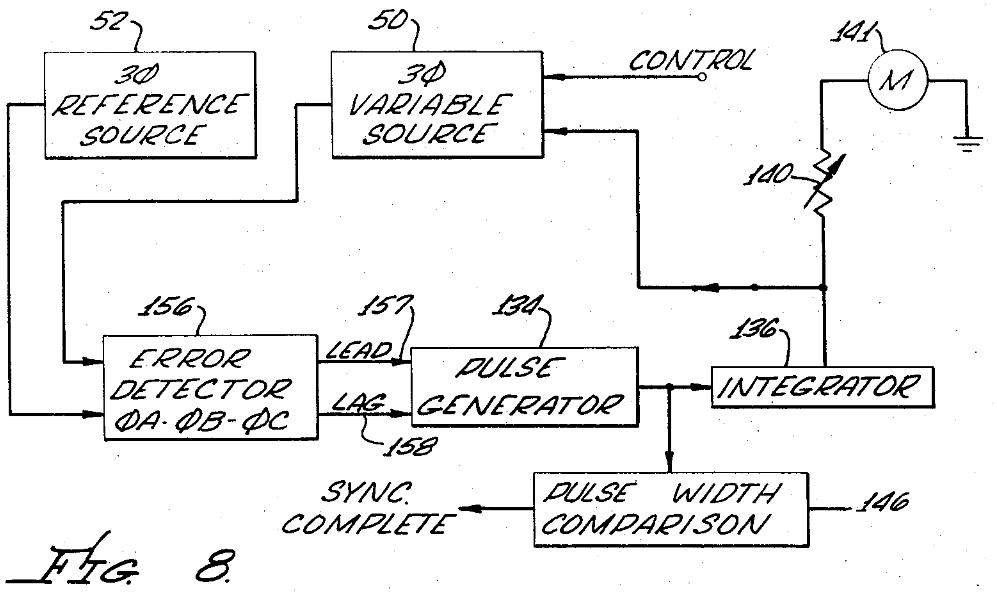
FIG. 8 is a block diagram of a modified form of the invention.

Accordingly, a simplified multi-component (multiphase) zero degree phase comparator may be constructed as illustrated in the block diagram of FIG. 8 wherein signals from the three-phase variable source 50 and signals from the three-phase reference source 52 are both fed to a combined sense and magnitude error detector 156 that provides a plurality of output pulses on a lead line 157, or alternatively provides a plurality of output pulses on a lag line 158. Pulses on lead line 157 occur only for a leading phase relation and each has a width proportional to the phase difference in degrees. Pulses on 158 occur only during a lagging relation and each also has a pulse width proportional to the phase difference in degrees.

Lines 157 and 158 of the embodiment of FIG. 8 are analogous respectively to the lead output line 68 and lag output line 66 of FIG. 3. The lead and lag pulses on lines 157 and 158 are handled as are the corresponding pulses of the embodiment of FIGS. 1 and 3. They are fed to a pulse generator 134 which may be identical to the corresponding pulse generator 34 of FIGS. 1 and 7, and thence to an integrator 136 which may be identical to the integrator 36 of FIGS. 1 and 7. The integrator output is employed to trim the frequency or phase of the variable source 50 so as to drive the detected phase error toward zero degrees. Further, and just as in the embodiment of FIG. 1, the output of the pulse generator 134 may be fed to a pulse width comparison circuit 146 that produces an output signal indicating synchronization has been completed. The output occurs whenever the width of a pulse from the pulse generator 134 (and accordingly the magnitude of the phase difference) is less than a predetermined value. The output of the integrator 136 may also be displayed on a meter 141 after suitable calibration in a variable resistor 140 to provide a visual indication of magnitude and sense of the phase error.

Figure 9:
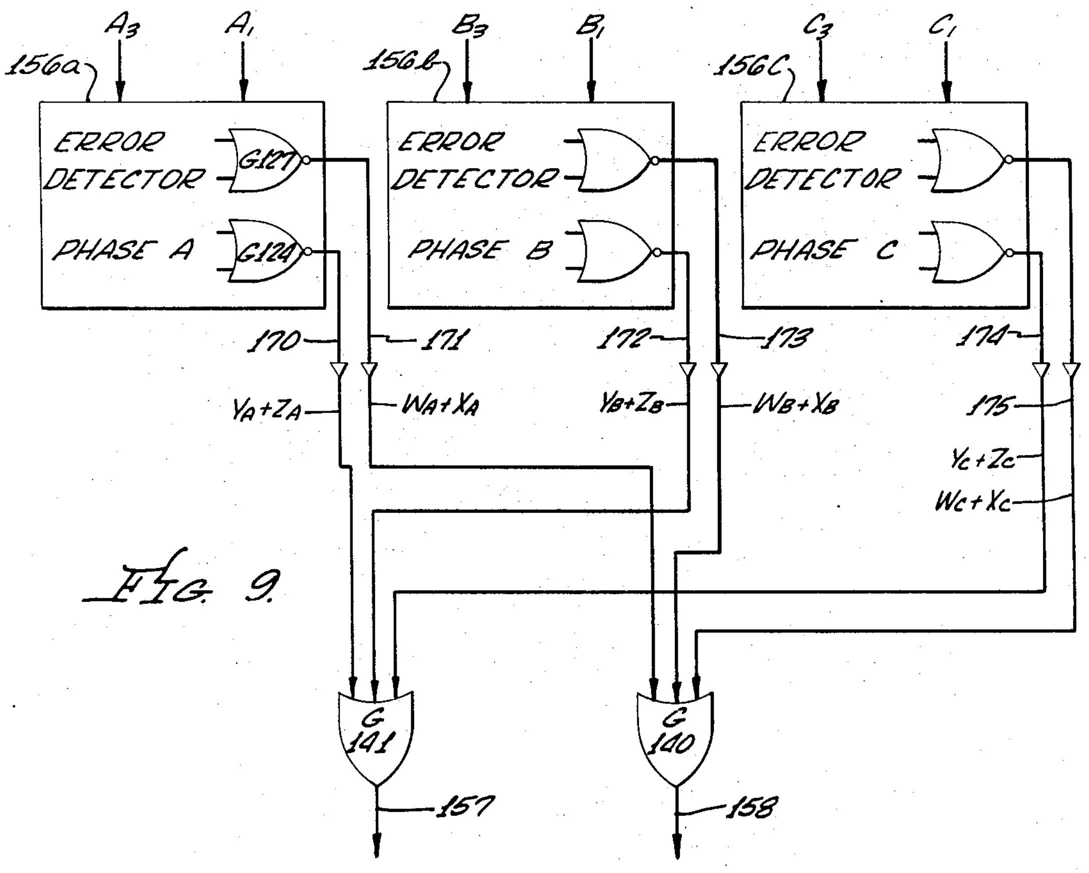
FIG. 9 shows the details of part of the system of FIG. 8.

Illustrated in FIG. 9 are further details of a mechanization of parts of the embodiment of FIG. 8 as employed for use in comparison of a pair of three-phase square wave signals such as the signals having components $A_1$, $B_1$, $C_1$ and $A_3$, $B_3$, and $C_3$ shown in FIG. 2. In this arrangement, the error detector 156 of FIG. 8 includes three channels of detector circuitry, **156*a*, 156*b* and 156*c*, each receiving corresponding components $A_1$, $A_3$, and $B_1$, $B_3$ and $C_1$, $C_3$ of the three phases of the two signals to be compared. Each of the error detecting channels 156*a*, 156*b*, and 156*c* is identical to each of the others except that each receives different phases of the signals being compared. Further, save for the omission of the output flip flop, each of these channels is identical to the phase A lead-lag detector circuit 56A shown specifically in FIG. 5. The channel circuits 156*a*, 156*b*, and 156*c* differ from lead-lag phase detector circuits 56A, 56B and 56C, respectively, only in the omission of the output bi-stable device formed by the pair of NAND gates G25 and G26, and also the omission of the corresponding output NAND gates of circuits 56B and 56C. In the arrangements of circuits 156*a*, 156*b*, and 156*c* the outputs are taken from NOR gates corresponding to G24 and G27 of the detector 56A of FIG. 5. Thus, as illustrated in FIG. 9, detector channel 156*a* is exactly the same as the detector channel 56A of FIG. 5 except that the outputs therefrom are taken from gates G124 and G127 respectively, which correspond to gates G24 and G27 of detector 56A of FIG. 5.**

Whenever the leading phase relation exists, with component $A_1$ leading the reference component $A_3$, signal $Y_a + Z_a$ appears on a lead 170 from detector channel 156*a*. This signal on lead 170 comprises the pulses $Y_a$ and $Z_a$ as shown in FIG. 6. For a lagging relation on the other hand, no output signal appears on lead 170, but a signal $W_a + X_a$ appears on line 171. As previously described, the signal on line 171 for such a lagging phase relation comprises a train of pulses each occurring during a non-coincidence of signals $A_1$ and $A_3$, there being one such pulse $W_a$ and one pulse $X_a$ for each cycle of the variable or reference signal, and each pulse has a width directly proportional to the phase difference degrees.

Error detector channels 156*b* and 156*a* similarly provide leading and lagging pulses on separate output lines 172 and 173 for the components $B_1$ and $B_3$ and on lines 174 and 175 for the components $C_1$ and $C_3$. All signals from the leading lines 170, 172, and 174 are inverted and fed through an OR lead gate G141 and all signals on the lag output lines 171, 173, and 175 are inverted and fed through an OR lag gate G140. The output of lead gate G141 is on the line 157 shown in FIG. 8 on which appear the phase error pulses for a leading relation. The output of lag gate G140 is on the line 158 of FIG. 8 on which appear the phase error pulses for a lagging relation. Pulse generator 134 receives the same type of pulses as are applied to the pulse generator of FIG. 7 via lines 68 and 66. Accordingly pulse generator 134, which is the identical circuit of FIG. 7, provides an output of fixed amplitude pulses of one polarity or the other depending on whether the phase relation is leading or lagging, each of such pulses having a width directly proportional to the magnitude of the phase error. These pulses are integrated by integrator 136 as previously described wherefore system applications and use of the circuit of FIGS. 8 and 9 may be identical to applications and use previously described.

There have been described methods and apparatus for measuring the sense and magnitude of phase error between two signals that are nearly in phase, and including a tracking arrangement to lock the two signals exactly at zero degree phase difference. A high resolution measurement is rapidly achieved by employing information from both half cycles of each signal component.

The foregoing detailed description is to be clearly understood as given by way of illustration and example only, the spirit and scope of this invention being limited solely by the appended claims.

I claim:

1. Apparatus for indicating the phase difference between first and second fluctuating signals comprising error magnitude detector means for generating a magnitude signal representative of the magnitude of the phase difference between said first and second signals, error sense detector means for generating a signal indicative of the sense of the phase difference between said first and second signals, pulse generating means responsive to both said detector means for generating error pulses having a polarity representing sense of the phase difference between said first and second signals and each also indicating magnitude of such phase difference, means for integrating said error pulses to provide an output error signal having a magnitude proportional to said phase difference and a polarity indicative of the sense of said phase difference, each of said first and second signals comprising three components of mutually different phases, said error magnitude detector means including means for generating a plurality of magnitude error signals, each respectively indicative of the magnitude of the phase difference between corresponding components of said first and second input signals, said pulse generating means comprising means for generating a pulse upon each occurrence of one of said error magnitude signals from said phase error magnitude detecting means, and said integrating means including means for integrating all of the pulses provided from said pulse generating means.

2. The apparatus of claim 1 wherein each component of each of said first and second signals comprises positive going and negative going part cycles, wherein said phase error magnitude detecting means includes means for generating a lead or lag pulse, one for each part cycle of each component of said first and second input signals, wherein said error sense detector means includes means responsive to each of said lead and lag pulses for gating said error magnitude signals so as to produce error magnitude signal pulses, separated according to error sense, on each part cycle of each component of said first and second signals, wherein said pulse generating means comprises means for generating a pulse having one polarity or the other in accordance with the sense of the phase difference between said first and second signals, said last mentioned pulse being generated once for each part cycle of each component of said first and second signals and having a width proportional to the magnitude of the phase difference between said first and second signals.

3. The apparatus of claim 2 including means for indicating when the width of said lead or lag pulse is less than a preselected amount to thereby indicate when the magnitude of the phase error is less than a predetermined magnitude.

4. Apparatus for indicating the phase difference between first and second alternating signals, each having positive going and negative going part cycles, said apparatus comprising first means for comparing positive going part cycles of each said first and second signals for generating a first lead-lag pulse representing both magnitude and sense of the phase difference between said positive going part cycles, second means for comparing negative going part cycles of said first and second input signals to generate a second lead-lag pulse indicating both magnitude and sense of the phase difference between said negative going part cycles, and means for combining said first and second lead-lag pulses to provide an output phase error signal representing both said lead-lag pulses, whereby said output phase error signal is based upon two comparisons for each full cycle of said first and second signals.

5. The apparatus of claim 4 wherein said first and second signals each comprises at least a pair of phase displaced components, each said component having positive and negative going part cycles, wherein said means for comparing said positive going part cycles includes means for comparing a positive going part cycle of the first component of said first signal with a positive going part cycle of the first component of said second signal, and means for comparing the positive going part cycle of the second component of said first signal with the positive going part cycle of the second component of said second signal, thereby to generate first and second positive part cycle error signals respectively representing magnitude and sense of the phase difference between positive going part cycles of first and second components of said first and second signals, wherein said means for comparing negative going part cycles of said first and second signals comprises means for comparing the negative going part cycle of said first component of the first signal with the negative going part cycle of the first component of the second signal and means for comparing the negative going part cycle of the second component of the first signal with the negative going part cycle of the second component of the second signal, thereby to generate first and second negative part cycle error signals respectively representing the magnitude and sense of the phase difference between the negative going part cycles of the first and second components of said first and second signals, and wherein said means for combining said lead-lag pulses comprises means for combining all of said positive going and negative going part cycle error signals thereby to provide an output signal bearing information based upon a plurality of different part cycle signal component comparisons.

6. A zero degree phase synchronizer for synchronizing a variable multiphase rectangular wave signal with either a first or a second multiphase rectangular wave reference signal comprising reference switching means for selectively providing components of either said first or second reference signals, a plurality of phase error magnitude detectors, each individual to a different component of the signals to be compared, each said detector comprising an exclusive Or gate having a first input from one component of said variable signal and a second input from a corresponding component of the chosen reference signal, and providing error magnitude pulses, a plurality of lead-lag detecting circuits, each individual to a pair of corresponding components of said variable and chosen reference signals, each lead-lag detector comprising means for generating a selector signal that represents that one of the components of the variable and chosen reference frequencies being compared by the individual detector that has a predetermined phase sense relative to the other of such components, and means for comparing said selector signal with both positive and negative going part cycles of said components being compared to obtain a pair of phase error sense signals for each full cycle of said components being compared, means for sequentially gating the phase error sense signals generated by said plurality of lead-lag circuits, means for sequentially combining the magnitude pulses from said plurality of phase error magnitude detectors, means for identifying said error magnitude pulses in accordance with the sense of said phase error sense signals, and means for averaging said error magnitude pulses so as to provide an output error signal containing information derived from two comparisons for each cycle of each component of said reference signal.

7. The apparatus of claim 6 wherein said means for sequentially combining said error magnitude pulses comprises pulse generator means for generating a pulse of a first polarity for each said error magnitude pulse that is identified by said lead-lag detecting circuits to represent a phase error of a first sense and generating a pulse of opposite polarity for each of said error magnitude pulses that is identified by said lead-lag detecting circuits to represent a phase error of opposite sense, and means for integrating pulses produced by said pulse generating means.

8. The apparatus of claim 6 including means responsive to the sense and magnitude of said detected phase error for changing said variable frequency signal in a sense to cause the phase difference to approach zero degrees.

9. The apparatus of claim 7 including means for indicating the sense and magnitude of the output of said integrating means.

10. The apparatus of claim 8 including means for comparing the magnitude of the phase error indicated by said error magnitude pulses with a predetermined error magnitude to provide an output indicating that the phase difference between said variable frequency signal and the chosen one of said reference signals is less than said predetermined magnitude.

11. A method of comparing two fluctuating signals of substantially the same frequency but subject to an unknown phase relation comprising the steps of generating a selector signal that coincides with that one of said first and second signals to be compared that has a predetermined phase sense relative to the other of the two signals being compared, and comparing said selector signal with both of said first and second signals to provide an error indication of said phase difference.

12. A method of comparing two fluctuating signals of substantially the same frequency but subject to an unknown phase relation comprising the steps of generating a selector signal that is in phase with that one of said first and second signals to be compared that has a predetermined phase sense relative to the other of the two signals being compared, and comparing said selector signal with both of said first and second signals to provide an error indication of said phase difference, said step of comparing said signals comprising the step of generating a first error signal ($Y_a$) when said first signal ($A_1$) occurs in the absence of both said second ($A_3$) and selector ($Q_1$) signals, and generating a second error signal ($Z_a$) when said second ($A_3$) and said selector ($Q_1$) signals occur together in the absence of said first ($A_1$) signal, said first and second error signals representing a phase difference of a first sense.

13. The method of claim 12 including the step of generating error signals representing a phase difference between said first and second fluctuating signals of a second sense opposite to said first sense, said last mentioned step comprising the steps of generating a third error signal when said first ($A_1$) and selector ($Q_1$) signals occur together in the absence of said second ($A_3$) signal, and generating a fourth error signal when said second ($A_3$) signal occurs in the absence of both said first ($A_1$) and said selector ($Q_1$) signals.

14. The method of claim 12 wherein said steps of generating said first and second error signals includes the step of generating each of said first and second error signals for a time substantially equal to the magnitude of the phase difference between said first ($A_1$) and second ($A_3$) signals.

15. The method of claim 13 including the step of separately presenting said first and second error signals and said third and fourth error signals so as to provide separated representations of respectively opposite sense phase differences between said first ($A_1$) and second ($A_3$) signals.

16. A phase comparator for first and second substantially rectangular wave signals comprising means for generating a selector signal that coincides with the lagging one of said first and second signals, and means for combining said selector signal with both said first and second signals to indicate noncoincidence of the leading one of said signals with both said selector signal and the lagging one of said first and second signals.

17. A phase comparator for comparing first and second substantially rectangular wave signals comprising a bi-state device connected to be set to a first state by coincidence of said first and second signals and to be reset to a second state upon the fall of the lagging one of said first and second signals, a first coincidence gate (G21) having as inputs thereto a signal representing the reset state of said device, a signal representing the absence of said first signal and a signal representing the presence of said second input signal, a second coincidence gate (G20) having as inputs thereto a signal representing the set state of said device, a signal representing presence of said first input signal and a signal representing absence of said second input signal, a third coincidence gate (G23) having a first input representing the reset state of said device, a second input representing presence of said first input signal and a third input representing absence of said second input signal, a fourth coincidence gate (G22) having an input representing the set state of said device, an input representing the absence of said first input signal and an input representing the presence of said second input signal, means for combining the outputs of said first and second coincidence gates to provide an output representation of a first sense phase difference between said first and second square wave signals, and means for combining the outputs of said third and fourth coincidence gates to provide a second input representation of a phase difference of opposite sense between said first and second square wave signals.

18. The method of effecting substantially zero degree phase synchronization between first and second input rectangular wave signals comprising the steps of detecting the magnitude of the phase difference between said first and second input signals, detecting the sense of the phase difference between said first and second input signals, combining the detected phase error magnitude and phase error sense to provide an output phase error signal representing both magnitude and sense of the phase error between said first and second input signals, and applying said output phase error signal to control one of said input signals so as to cause the phase difference therebetween to approach zero, said step of detecting magnitude of the phase difference comprising detecting magnitude of the phase error between positive going part cycles of said first and second input signals and separately detecting magnitude of the phase error between negative going part cycles of said first and second input signals.

19. The method of claim 18 wherein each of said input signals comprises at least two mutually phased displaced components and wherein said step of detecting magnitude of the phase difference includes the steps of detecting magnitude of the phase error between a first component of said first input signal and a first component of said second input signal, and also detecting the magnitude of the phase error between a second component of said first input signal and the second component of said second input signal.

20. The method of claim 19 wherein said step of combining the detected error magnitude and phase error comprises means for producing a plurality of pulses, each representing magnitude of the phase error but separated according to the detected sense of the phase error, and further including means for integrating said pulses to provide said output phase error signal.

21. A zero degree phase comparator for comparing the sense and magnitude of the phase error between first and second rectangular wave signals comprising lead detector means for generating a series of lead pulses each representing noncoincidence of said first and second signals whenever a leading relation exists between said first and second signals, said lead pulses each having a duration representative of the duration of such noncoincidence between said first and second signals, lag detector means for generating a series of lag pulses each representing noncoincidence of said first and second signals whenever a lagging relation exists between said first and second signals, each said lag pulse having a duration representing the duration of noncoincidence between said first and second signals, pulse generator means for generating a plurality of pulses, each representing the duration of one of said lead or lag pulses and each having one polarity or another in accordance with whether said lead or lag pulses are produced by said lead and lag detector means, each of said lead detector means and lag detector means comprising means for generating a selector signal that coincides with that one of said first and second signals that has a predetermined phase sense relative to the other, and means for combining said selector signal with said first and second signals to obtain said lead or lag pulses.

* * * * *